Sept. 19, 1967 A. WRIGHT ETAL 3,342,979
ELECTRONIC DATA ACQUISITION ASSISTANT TO THE COST ESTIMATOR
Filed July 22, 1963 17 Sheets-Sheet 13
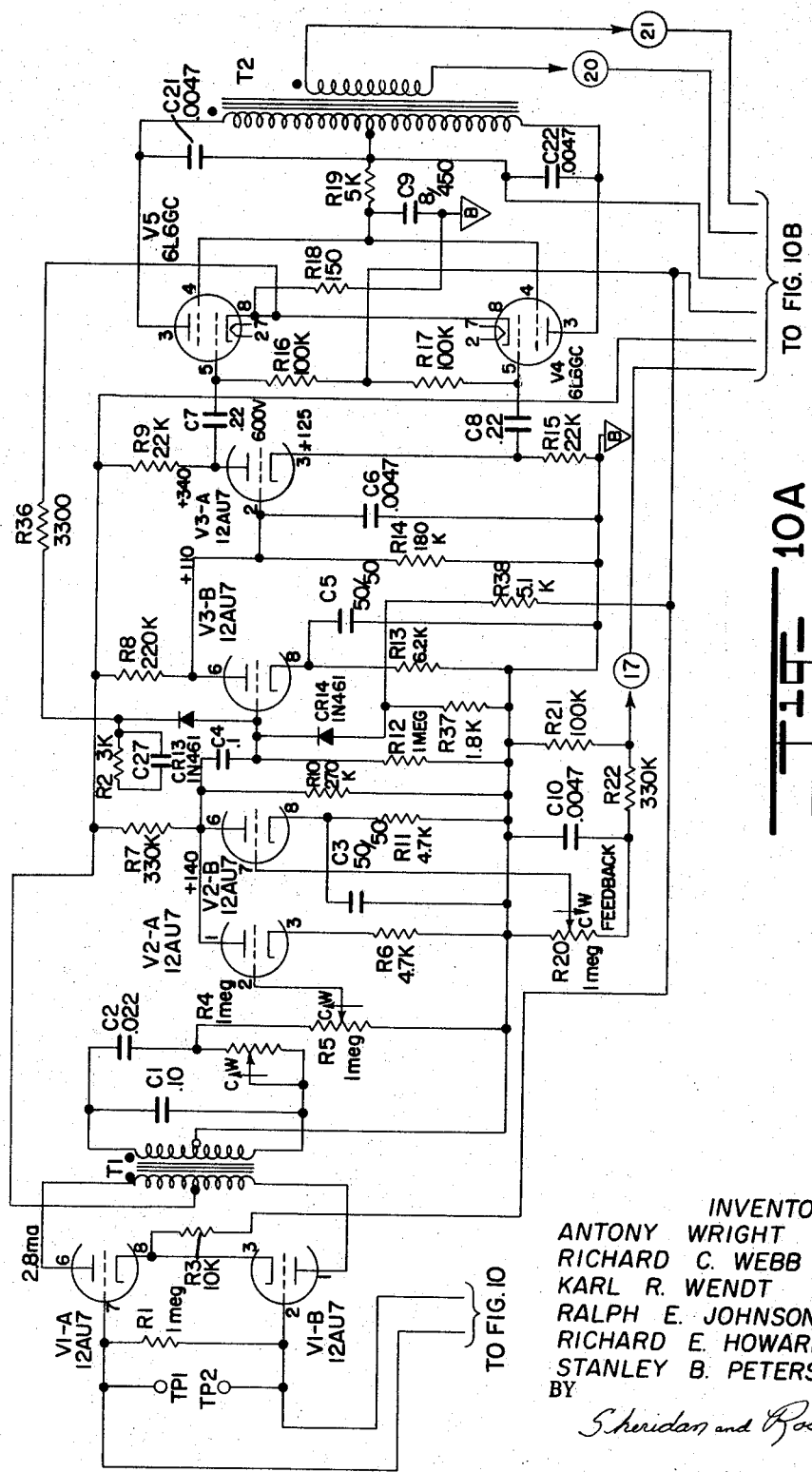
INVENTORS
ANTONY WRIGHT
RICHARD C. WEBB
KARL R. WENDT
RALPH E. JOHNSON
RICHARD E. HOWARD
STANLEY B. PETERSON
BY
Sheridan and Ross
ATTORNEYS

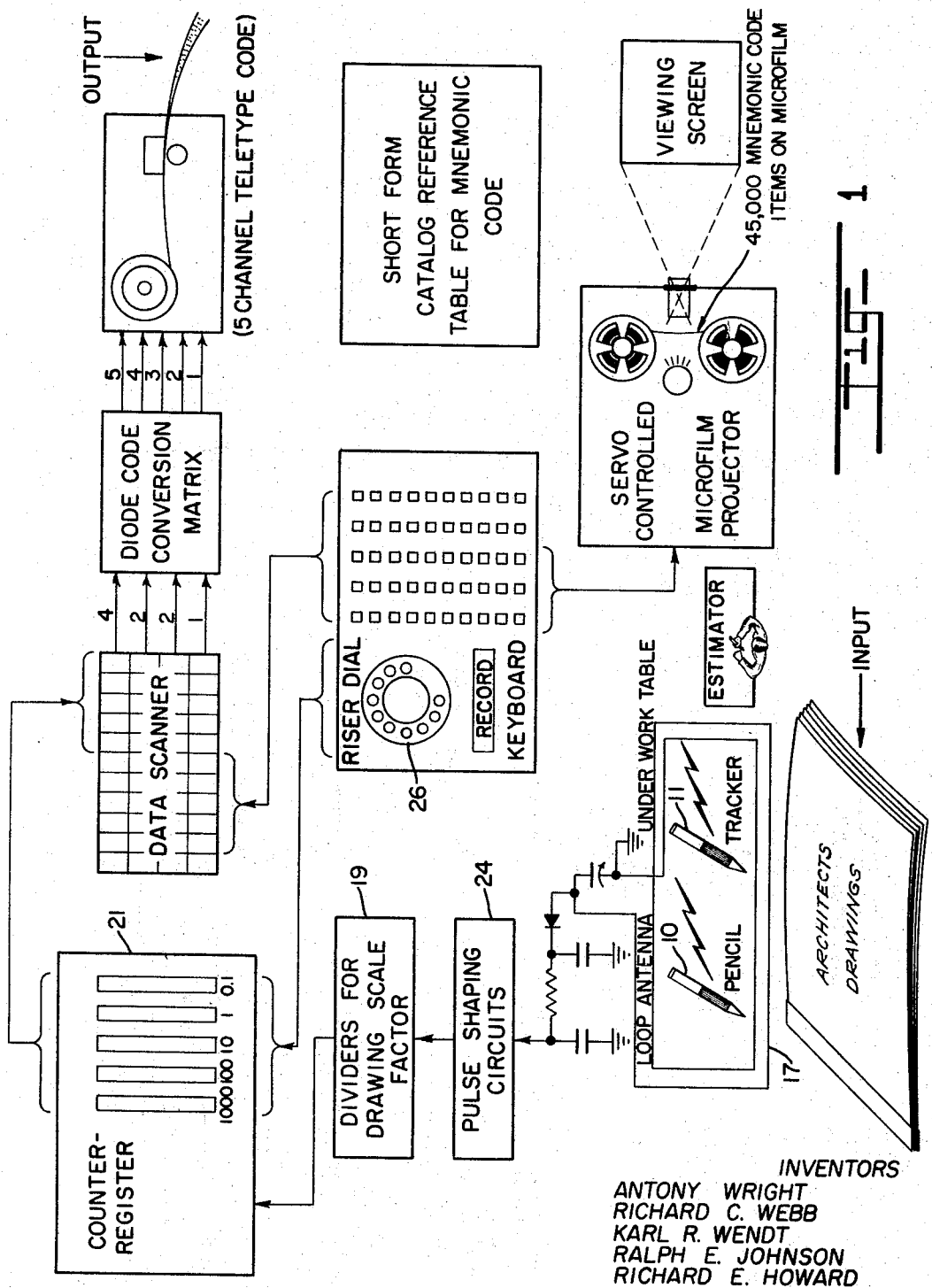

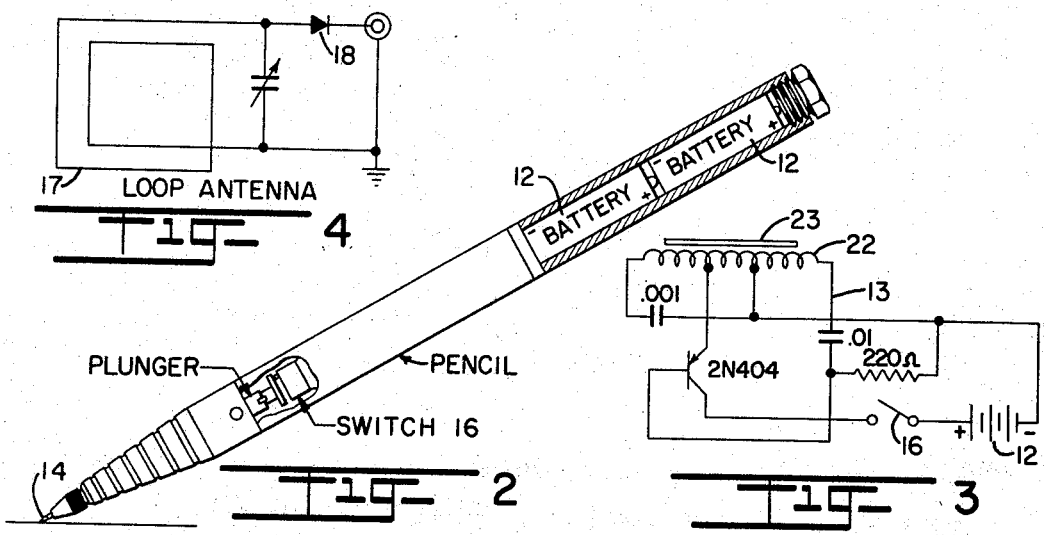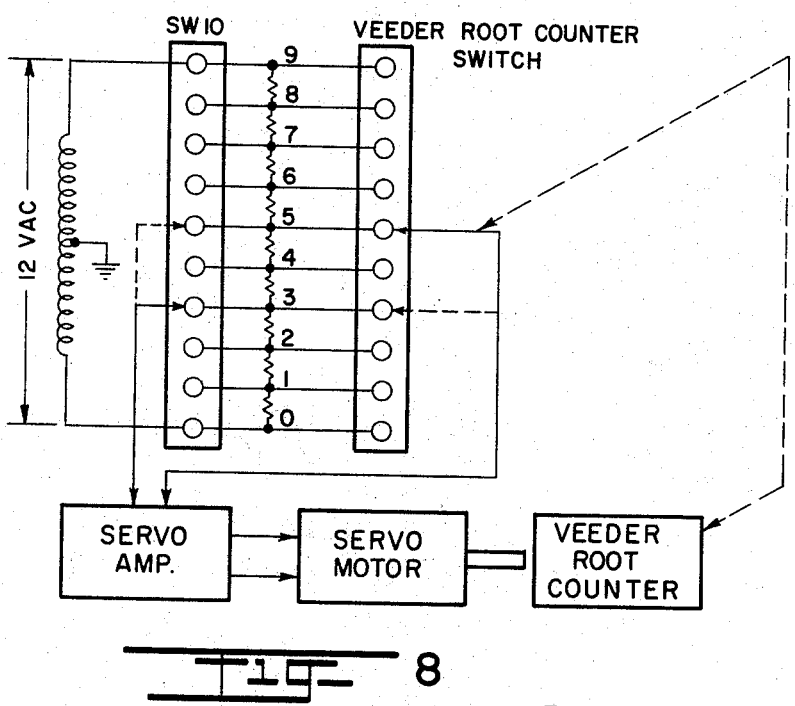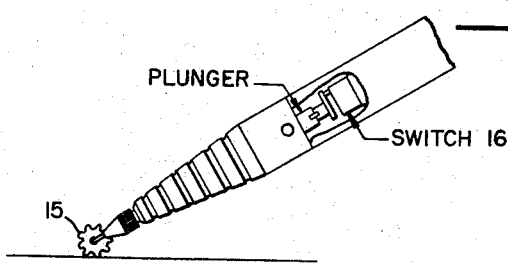

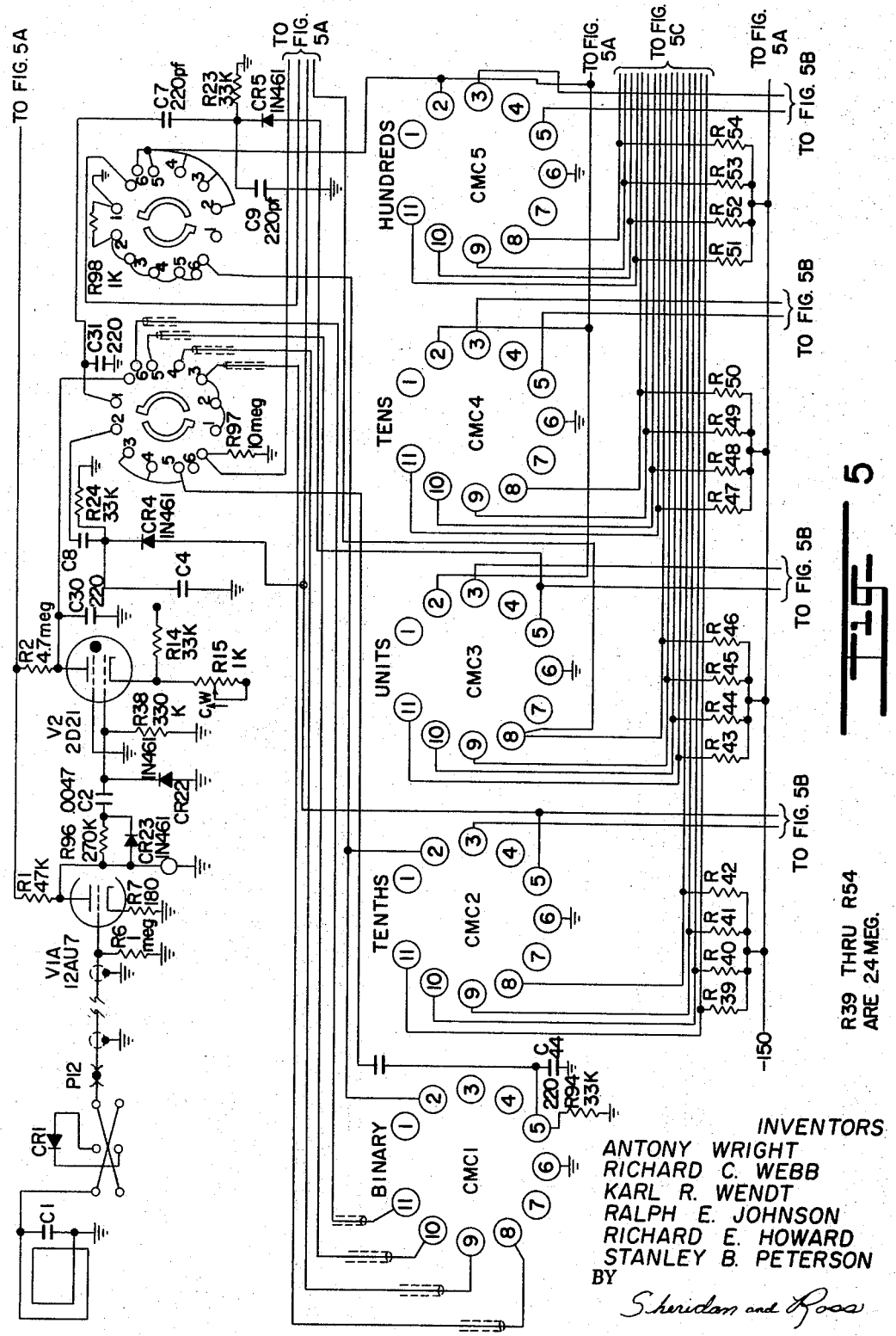

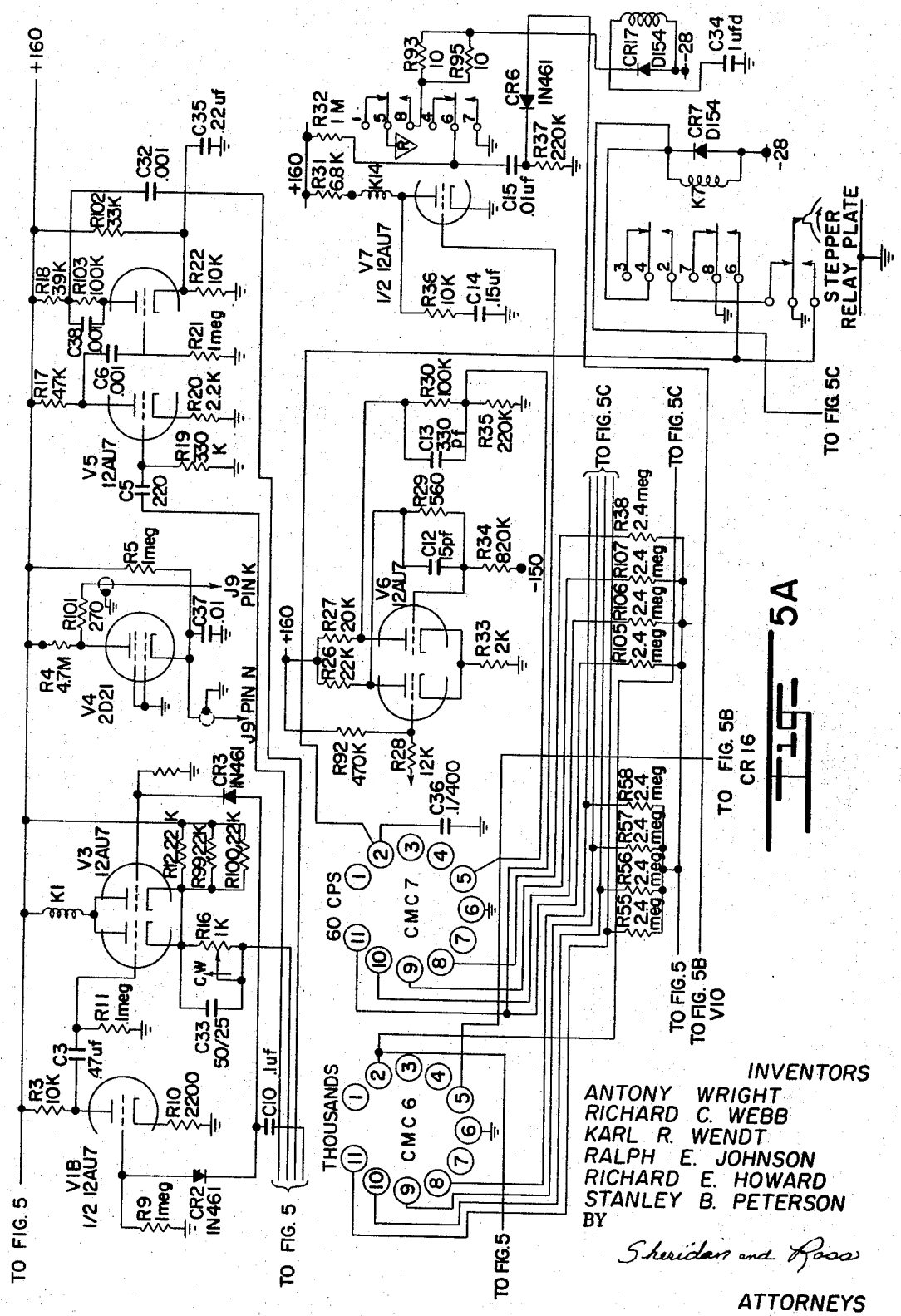

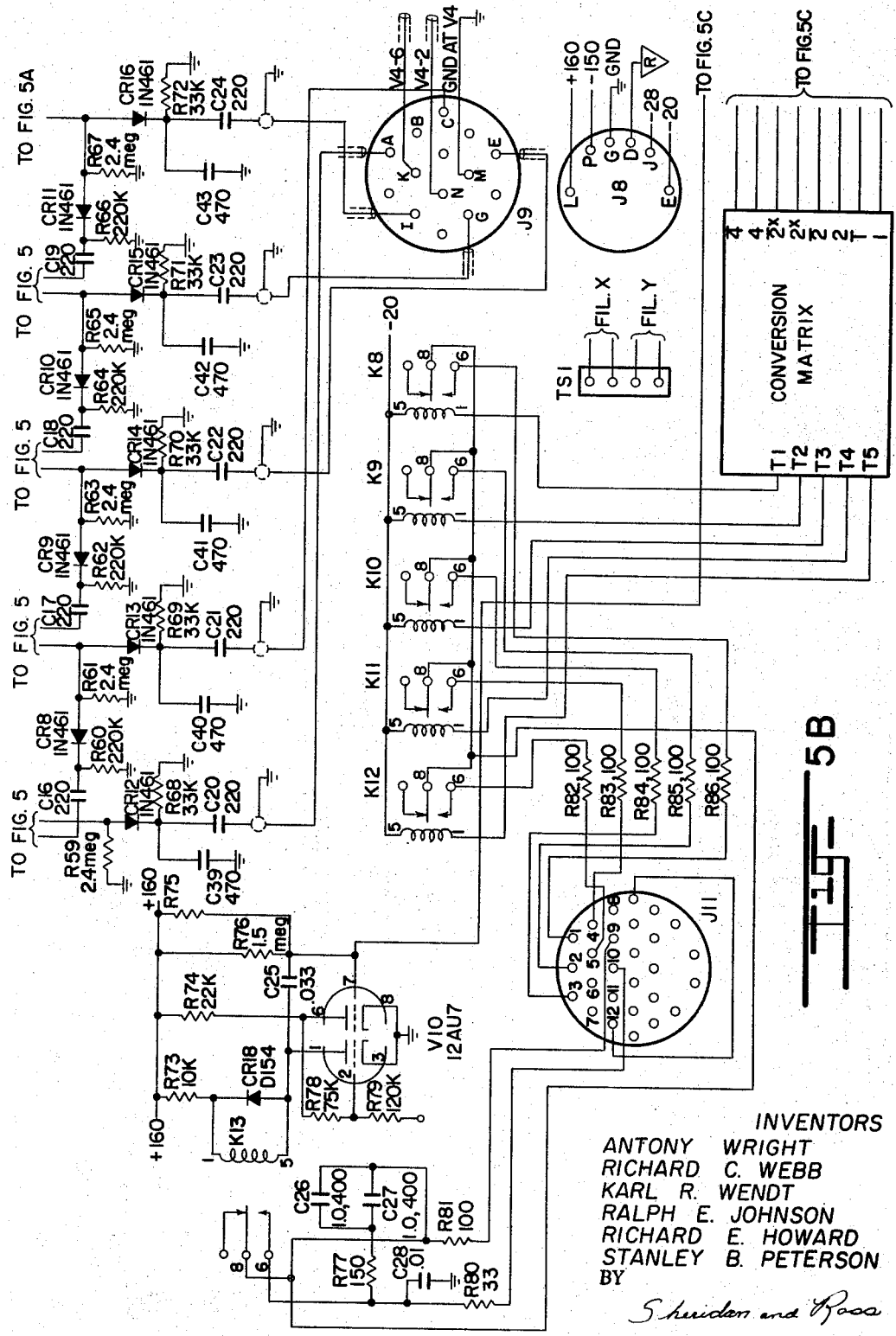

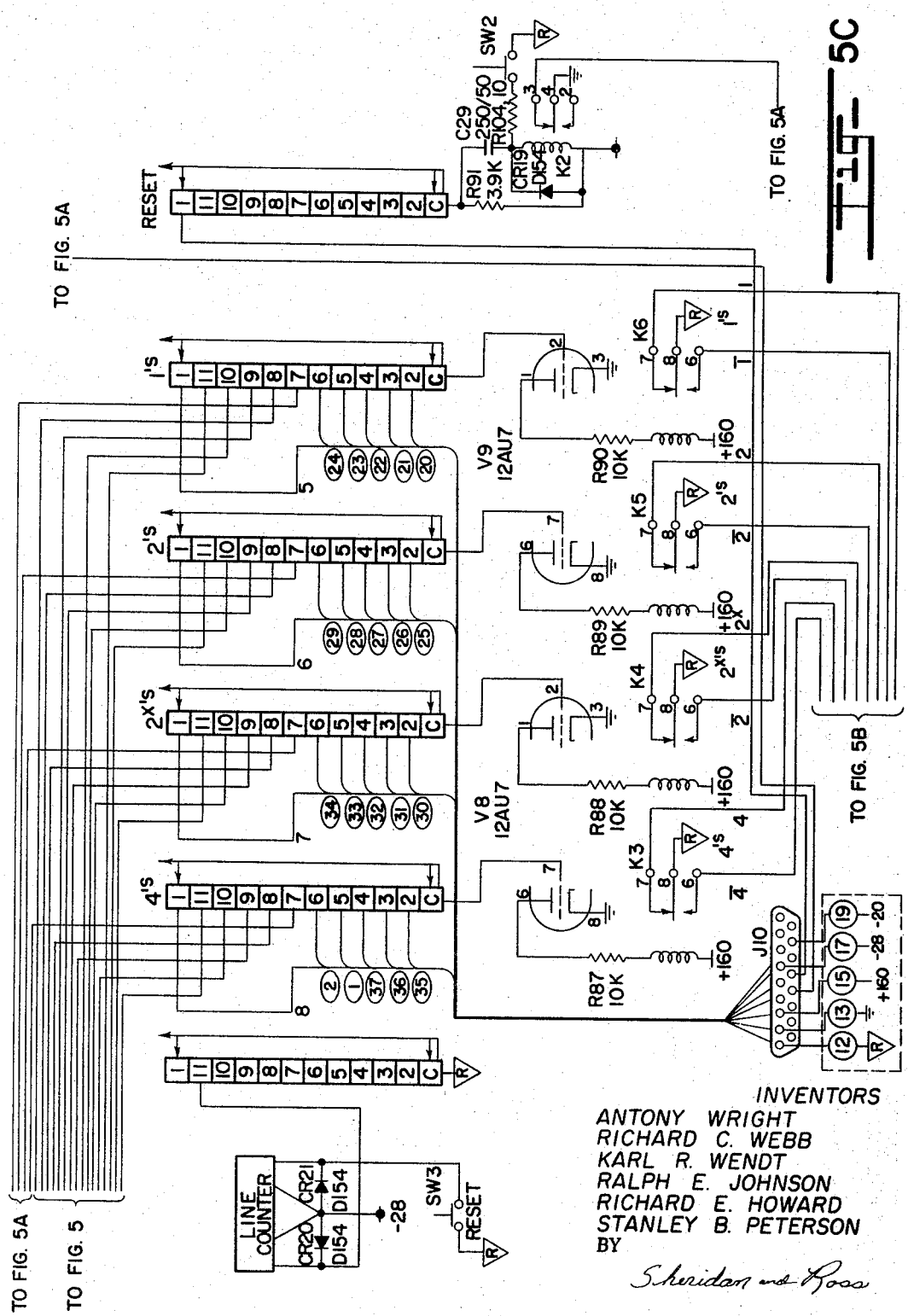

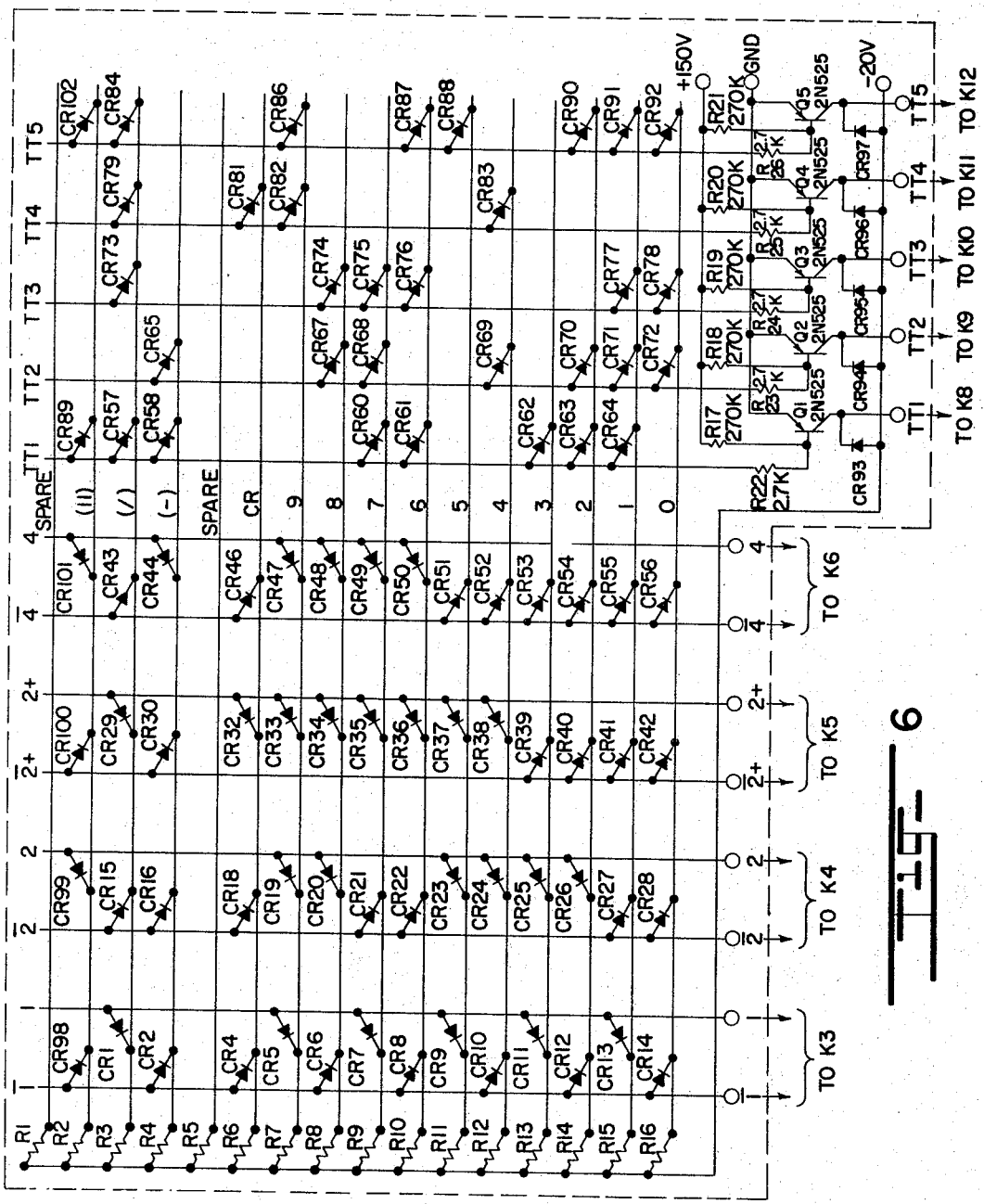

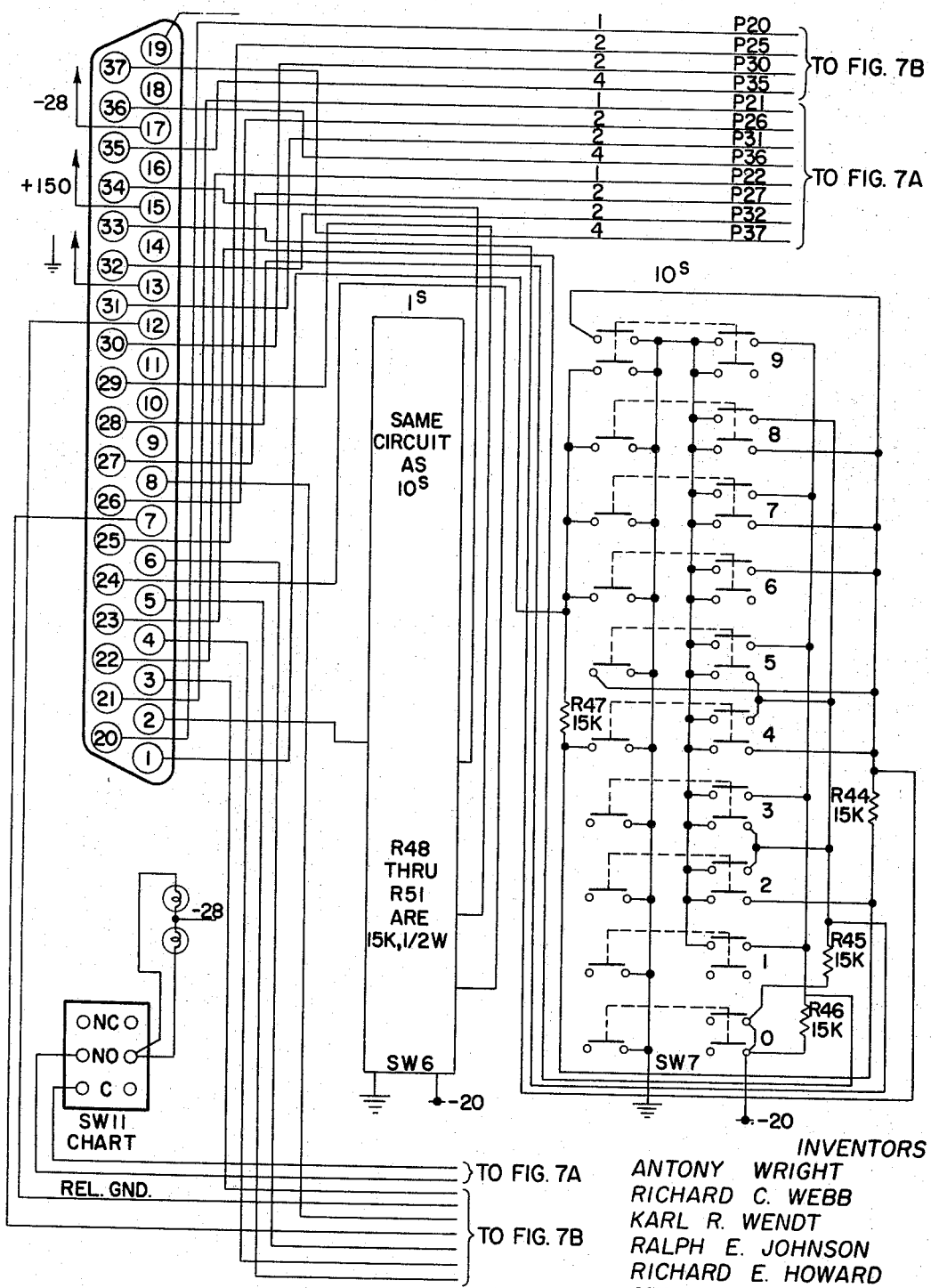

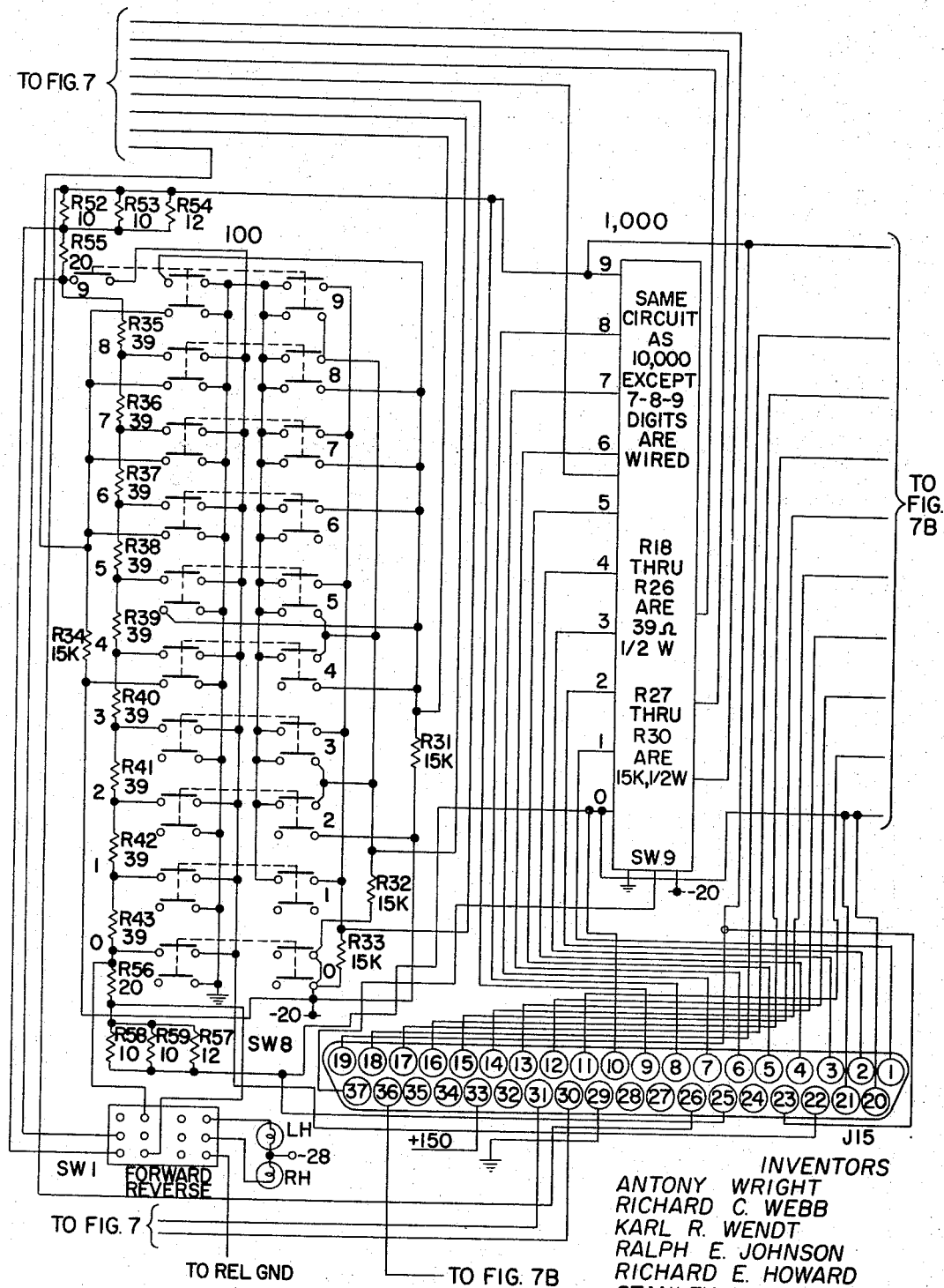

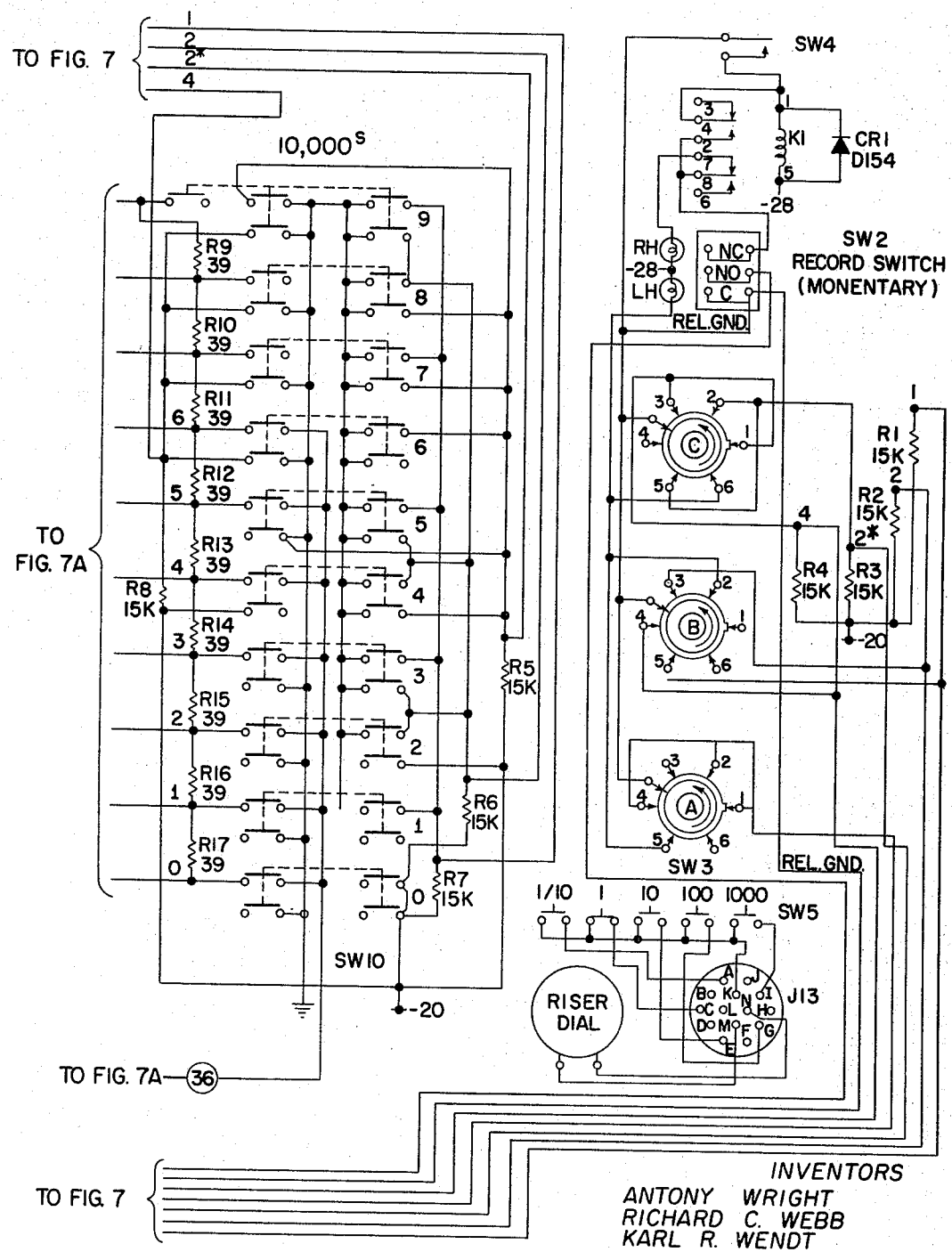

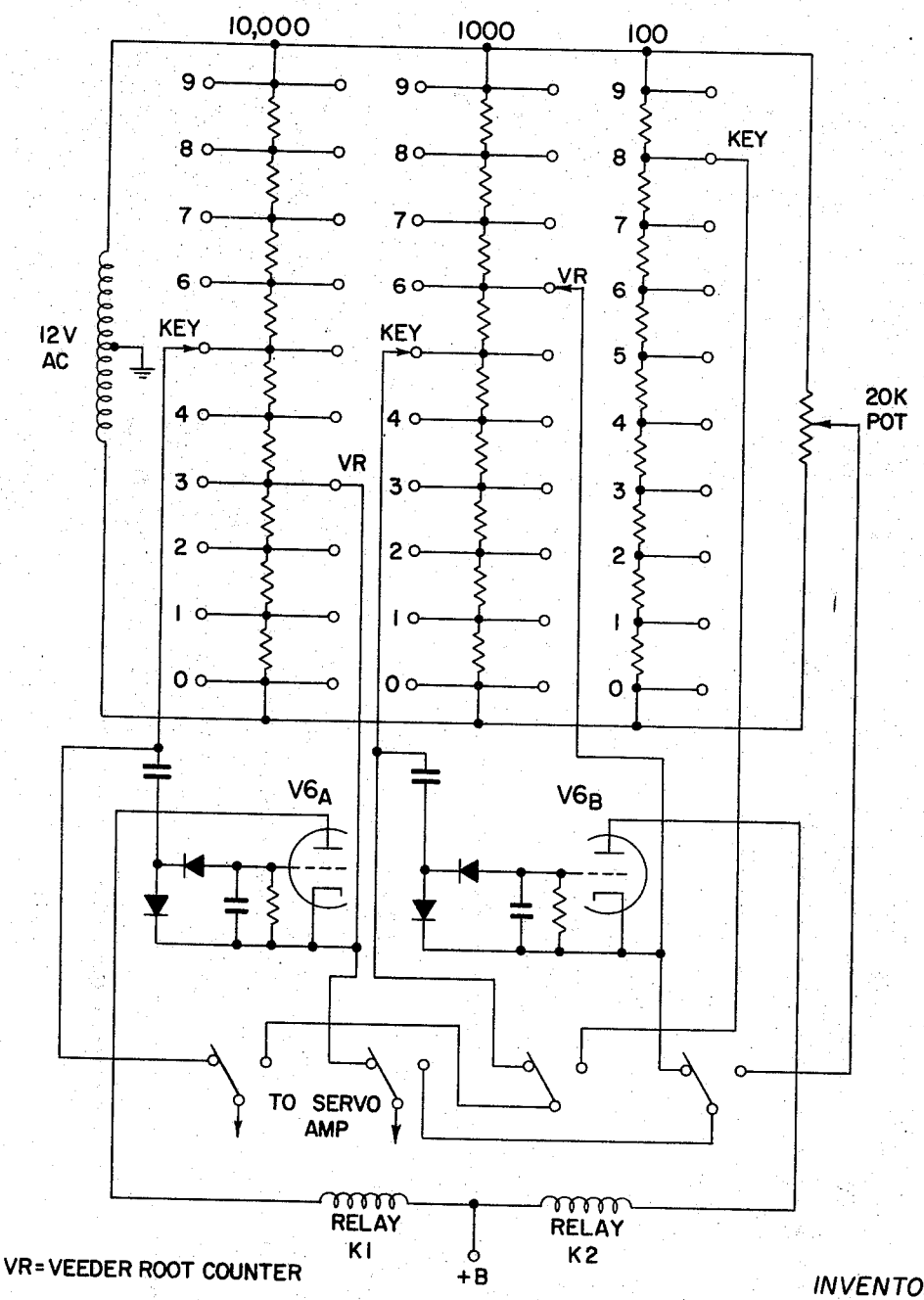

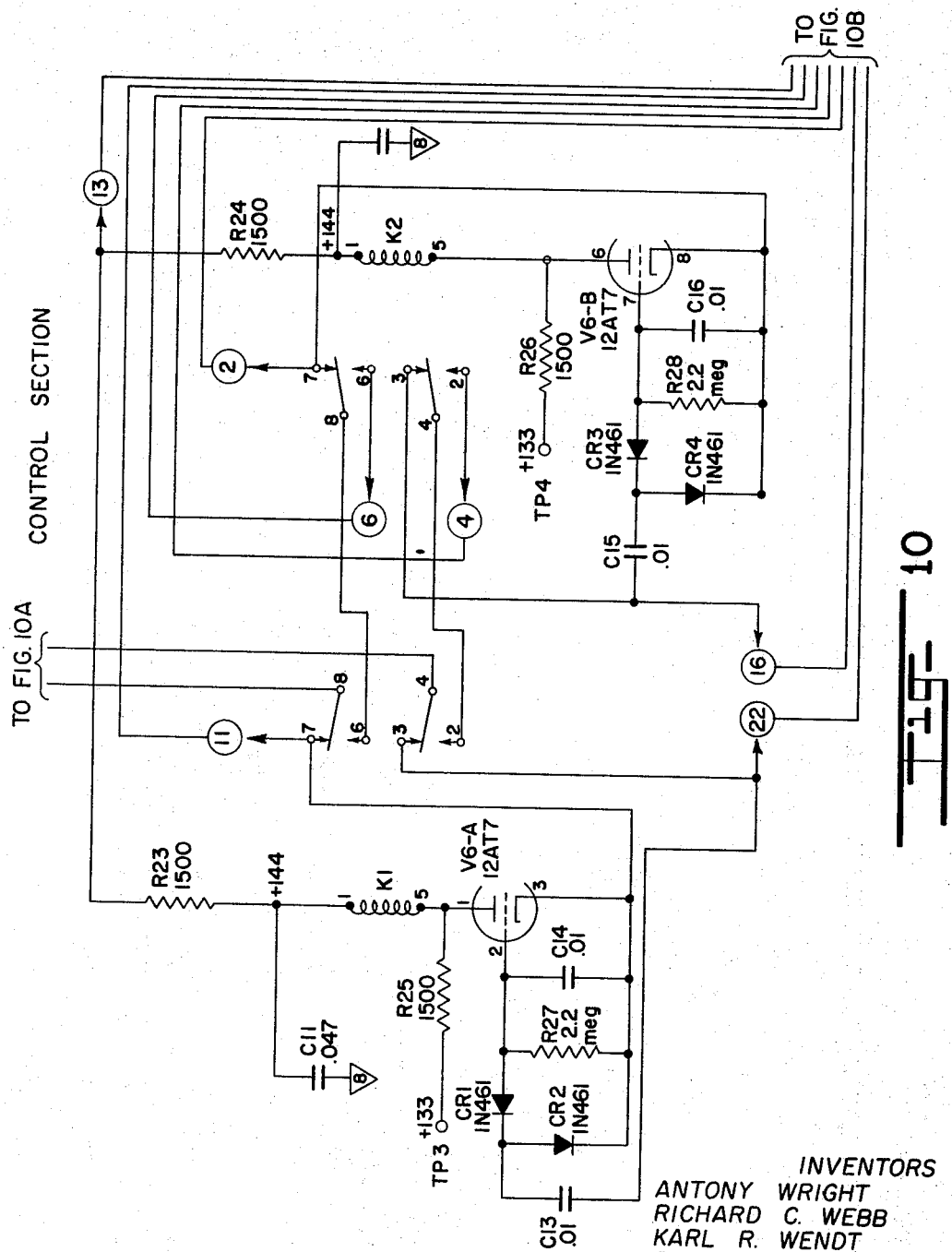

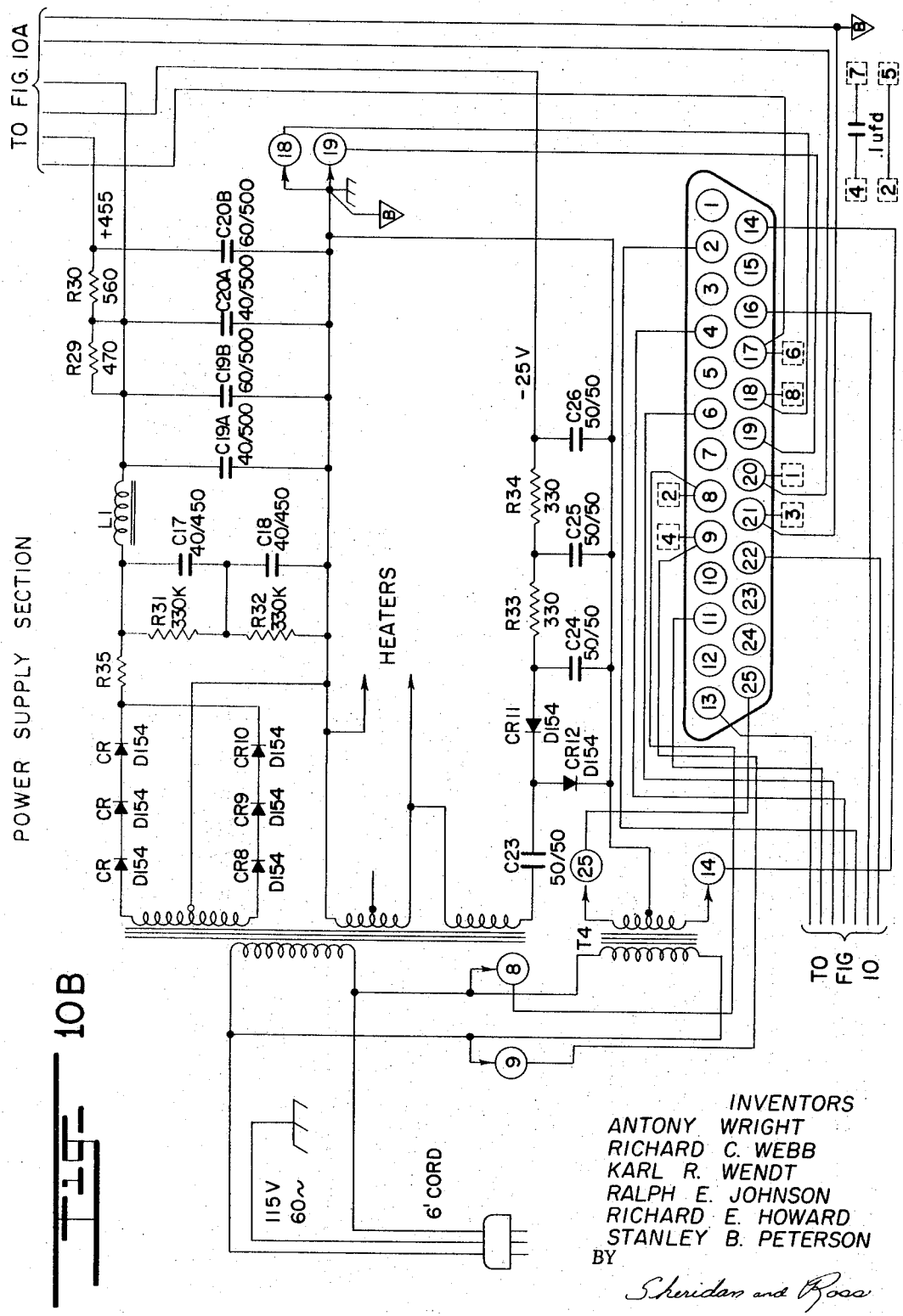

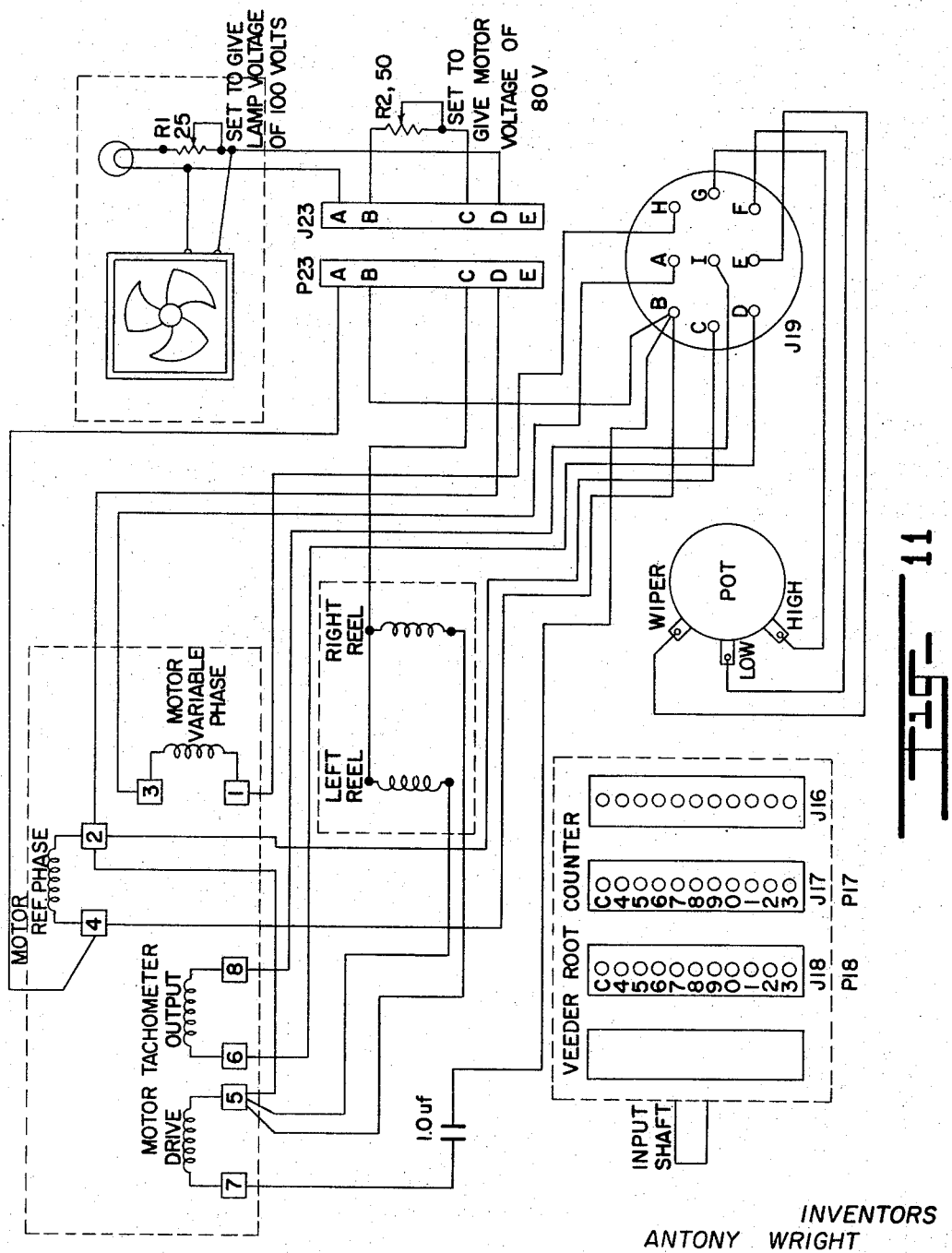

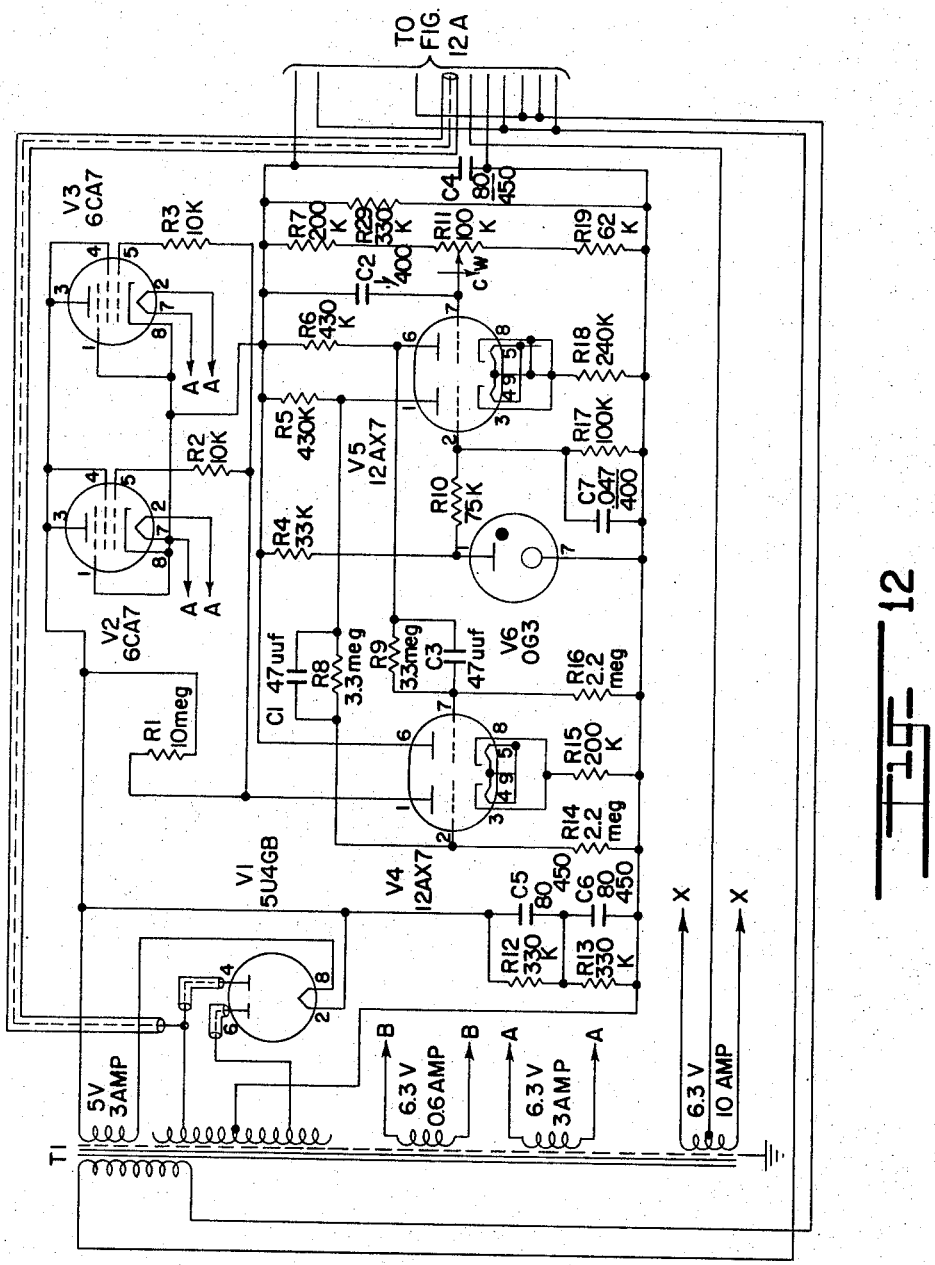
Sept. 19, 1967  A. WRIGHT ETAL  3,342,979
ELECTRONIC DATA ACQUISITION ASSISTANT TO THE COST ESTIMATOR
Filed July 22, 1963  17 Sheets-Sheet 16
INVENTORS
ANTONY WRIGHT
RICHARD C. WEBB
KARL R. WENDT
RALPH E. JOHNSON
RICHARD E. HOWARD
STANLEY B. PETERSON
BY
ATTORNEYS

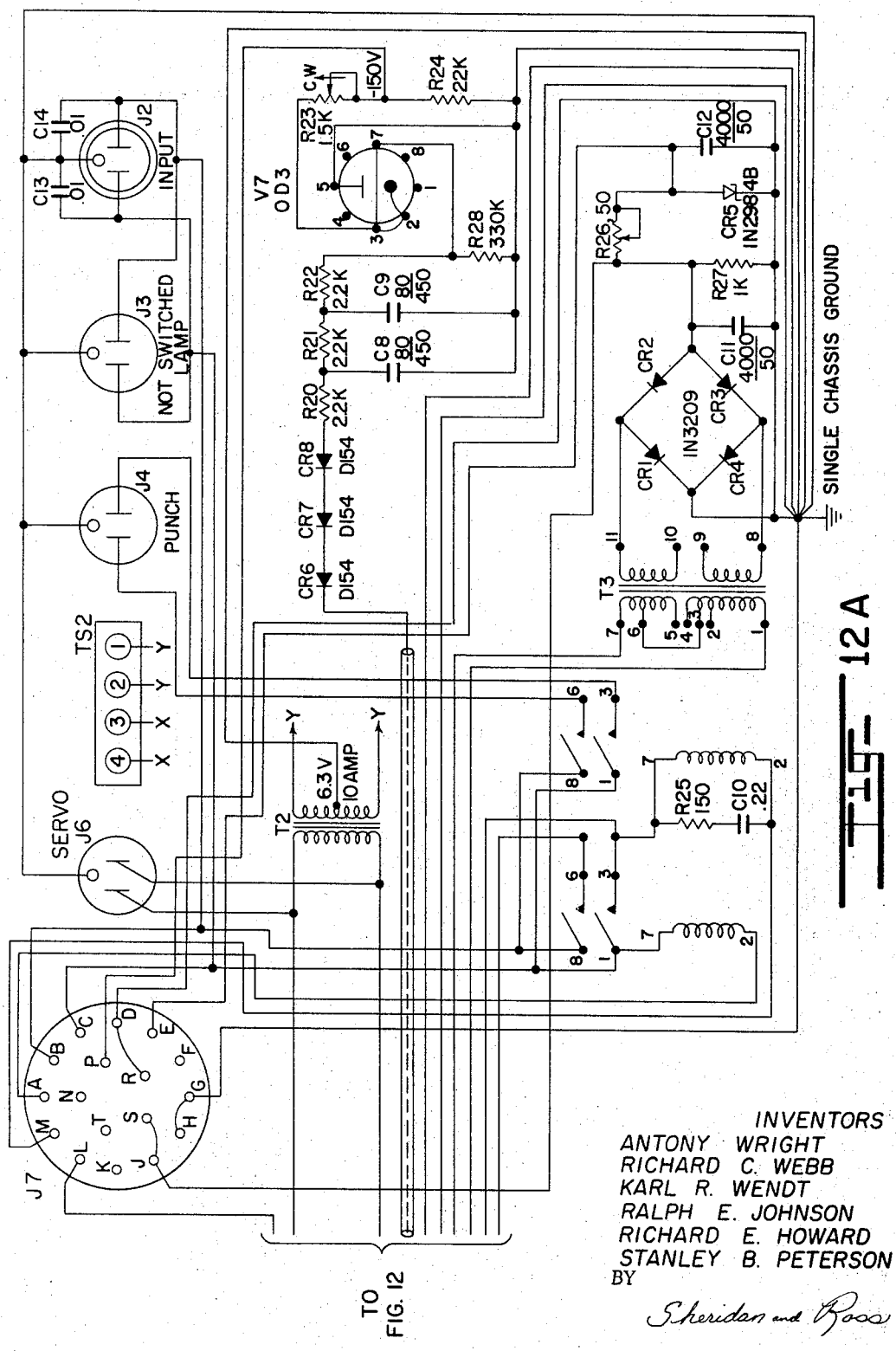

United States Patent Office 3,342,979
Patented Sept. 19, 1967

3,342,979
ELECTRONIC DATA ACQUISITION ASSISTANT
TO THE COST ESTIMATOR
Antony Wright, Denver, Richard C. Webb and Karl R. Wendt, Broomfield, Ralph E. Johnson and Richard E. Howard, Denver, and Stanley B. Peterson, Broomfield, Colo., assignors, by direct and mesne assignments, to Estimatic Corporation, Denver, Colo., a corporation of Colorado
Filed July 22, 1963, Ser. No. 297,488
18 Claims. (Cl. 235—92)

ABSTRACT OF THE DISCLOSURE

This invention is an apparatus for aiding a cost estimator by converting the data on drawings into data pulses. The data pulses are accumulated in a register to provide a total accumulation. In one embodiment, an electronic transmitter is triggered to generate a pulse for each drawing item of a particular nature. When a total is achieved the data pulses are converted into cost pulses and a total cost is read out. In a second embodiment a pulse transmitting means is provided that can be moved over drawing lines and generate pulses related to the distance covered by the transmitting means. These pulses are accumulated in the register to determine the total distance covered by the transmitter. This provides a total which is related to the length of wire or conduit on the drawing, for example, and can also be converted into cost pulses and read out as a total cost. In addition, a means is provided for adding pulses to the accumulated pulses when risers or elements not illustrated on the drawings must be added to the total cost.

---

This invention relates to an electronic digital data acquisition system designed for use but not so limited in the building trades industry as a means of increasing the speed and accuracy and reducing the drudgery in taking off the materials called out on architects' drawings, or other building construction blueprints.

The electronic system of this invention is complementary to a system of estimating man-hours and material cost for electrical contracting work, known as the Estimatic system, introduced by Ralph E. Johnson of Sturgeon Electric Company. The electronic system serves to further improve accuracy and speed in estimating man-hours and material cost for electrical contracting by the use of digital data acquisition equipment. It will be understood that while the initial application of the electronic system of this invention is in electrical contracting work, the extension to other building construction trades, inventory control, etc., is contemplated.

The Estimatic system, involving many years of effort, is basically a compilation of electrical assembly lists of items normally used in electrical installations. For example, switch boxes, fixtures, fuse boxes can be considered. Since there are many variations of such parts and since the installation of a given item may be affected by construction or environment, the assembly hardware can vary. Prior to the introduction of the Estimatic system, an estimator had to take off in quantity, list, and tabulate each individual item to obtain the total required for a given installation, thousands of manual operations frequently being involved. The Estimatic system takes full cognizance of this problem and assigns code numbers to assembly drawings which properly identify not only the item, but its assembly hardware numbers and the labor content. Materials are grouped by assemblies and identified by a ten-character alpha-numeric code. Because of the mnemonic design of the code, an estimator familiar with its use can usually form the code, identifying a particular required assembly, from memory. The Estimatic system has proven its effectiveness in organizing vast quantities of construction items and increasing the accuracy of the estimators by more than doubling their work output. However, the laborious task of taking off assembly quantities from the architects drawings has become the chief bottleneck in further improving estimator production. With the manual system it is necessary to write each codeword manually, count the items and from the resulting quantities and codes, make punched cards for machine processing.

Accordingly, it is a principal object of this invention to provide a digital data acquisition system or machine which will aid the estimator in taking off the items called out on drawings and in quickly transferring this data to a digital computer.

Another object of this invention is to provide an electronic system or machine which will increase the speed and accuracy, and reduce the drudgery of estimators in taking off the materials called out on drawings such as architects' drawings, building construction blueprints and the like.

Additional objects of this invention will become apparent from the following description, which is given primarily for purposes of illustration and not limitation.

Stated in general terms, the objects of this invention are attained by providing a system or machine including an electronic pencil and an electronic tracker which are used by the estimator as checkers or checking elements to mark off material items, conduit runs, etc. as he studies the drawings. The pencil and tracker tracing elements issue radio pulses, which are picked up and accumulated as unit counts in a display or counter register. This data later is transferred to a recording means, such as punched paper tape recordings, suitable for immediate computer processing, or teletype transmission to a distant computer center. Because code numbers are used in the estimating process, a computer can be programmed to assemble the full bill of material and total labor hours for an electrical contractor, for example, from the take off information. The system or machine of this invention eliminates the writing process of the estimator, adds speed and accuracy to the counting operation, provides automatic scaling for length measurement and tabulation and eliminates the card punching operation completely, thereby saving considerable time in the process.

A more detailed description and a specific embodiment of the system or machine of this invention is given below with reference to the appended drawings, wherein:

FIGURE 1 is a block diagram schematically showing the elements of a specific embodiment of the data acquisition system of this invention;

FIGURE 2 is a side elevational view, with portions broken away, showing a pencil through which acquired data is entered into the system;

FIGURE 2A is a partial side elevational view, with a portion broken away, showing a tracker through which acquired data is entered into the system;

FIGURE 3 is a schematic wiring diagram showing the tuned circuit contained in the pencil and in the tracker checking elements;

FIGURE 4 is a schematic wiring diagram showing a tuned loop antenna into which the checking elements of FIGURE 3 couple;

FIGURES 5, 5A, 5B and 5C are schematic wiring diagrams showing circuitry mounted in a counter chassis;

FIGURE 6 is a schematic wiring diagram showing the circuitry of a code conversion matrix;

FIGURES 7, 7A and 7B are schematic wiring diagrams showing the circuitry of a keyboard;

FIGURE 8 is a schematic diagram showing an elemental circuit of servo switching;

FIGURE 9 is a schematic diagram showing a keyboard and relay function;

FIGURES 10, 10A and 10B are schematic wiring diagrams showing the circuitry of a servo amplifier;

FIGURE 11 is a schematic diagram showing a microfilm chart drive; and

FIGURES 12 and 12A are schematic wiring diagrams showing the circuitry of a power supply.

FIGURE 1 shows a block diagram of the elements of the system or machine. Data is entered through the pencil 10 or tracker 11. The pencil 10 and the tracker 11, checking elements, are actually miniature radio transmitters operating at about 550 kc. from two standard 1½-volt dry cells 12 (FIG. 2). They employ a unique electronic circuit 13 (FIG. 3) using a 2N404 transistor which develops about 25 volts peak-to-peak energy across a tuned circuit. Pressure on the pencil lead 14 in the pencil 10 or rotation of the wheel in the tracker head actuates a switch 16. This turns the transmitter 13 on and it will stay on until the pressure is removed. The radio energy generated by the pencil transmitter 13 is picked up by a high Q antenna 17 (FIG. 4) and detected by a diode 18.

The result of a check mark made by the pencil 10 is a pulse whose duration depends upon the length of time the switch 16 is closed during the process of making a check mark. The pulse so produced has sharp leading and trailing edges. The count takes place at the trailing edge of the pulse as the pencil 10 is removed from the paper. It is important to remember this since later some discussion will relate to the shape of the pulse.

In the tracker 11, (FIG. 2A) a serrated cam wheel 15 moves a plunger up and down, which actuates the switch. The wheel is so constructed that as it is rolled across the print, every 1/16 inch of travel causes the switch to close once. A movement of one inch produces 16 discrete pulses; their frequency and duration depend on the speed with which the tracker 11 is moved across the paper. This, too, is important; the time constants of the input system do not allow too fast a movement but are arranged for a realistic speed of motion. If the scale of the drawing is ⅛ inch equals one foot, a binary divider 19 is introduced between the received pulses and the input of the counter 21, thereby entering a count for each scale foot on the drawing. Additional dividers 19 are used to handle scales of ¼, ½, and 1 inch equals one foot.

The tuned circuit 13, whose inductor 22 is wound on a ferrite rod 23, emits a substantial magnetic field and couples into a tuned loop antenna 17 located beneath a work table. The transmission of pencil 10 and tracker 11 can be picked up only when they are operated directly over loop antenna 17.

So tightly coupled are the signal sources 10 and 11 that several volts of rectified RF signal are obtained from the diode detector 18 connected directly to the loop 17. The rectified pulses from the loop circuit 17 are connected to the input of the counter register 21 (FIG. 1) through a thyratron pulse-shaping circuit 24 (FIG. 5) which includes an integrating network that discriminates between noise entering the loop 17 from local disturbances, such as telephone dialing, fluorescent lights, motors, breakers, etc., and the discrete pulses from pencil 10 and tracker 11. The principle of noise discrimination is based on the fact that natural noise sources are characterized by issuance of pulses having rapid rise times but slow decay. Pulses from pencil 10 and tracker 11 are rapid on both rising and falling edges; hence, use of the falling edge insures very adequate noise immunity.

Since elevations are not measurable on a two-dimensional drawing, a telephone riser dial 26 is provided to permit the operator to add unit counts that would be equivalent to the elevation from the floor to an outlet box or wall switch plate. Pulses from this riser dial 26 also can be switched into any one of the five-digit positions of the counter register for convenience in presetting or rearranging data in the register.

Identification of the items stored in the register is accomplished through the use of the material assembly coding system, known as the Estimatic system, referred to above. While the mnemonic coding scheme of the Estimatic system permits ready identification of assembly items by the estimators, it is not a code suitable for direct digital computer entry; so a means for obtaining a five-digit numeric equivalent to each item in the mnemonic assembly code had to be developed. This was accomplished with use of an index listing 650 assembly code abbreviations through which access to the full 45,000 assembly codes can be quickly reached by means of a keyboard-controlled servo-driven microfilm viewer. The estimator is thus able to examine all existing ten-digit mnemonic codes available and quickly locate the desired five-digit numerical equivalent.

For example, pull boxes are "BXP's" in the Estimatic code. From the assembly code abbreviation table mounted before the operator, it is seen that BXP's are on page 234 of the microfilm catalog. The operator, therefore, enters 234 in the first three positions of a manual keyboard and waits momentarily for the high speed servo-controlled microfilm projector to bring this page into view on the display. As many as 100 existing mnemonic codes for pull boxes can now be seen. Knowing the detailed requirements of the situation, the estimator selects the assembly code that meets the specifications, noting the last two digits of its five-digit equivalent and entering them into the last two positions on the keyboard.

The numeric assembly code identifications are thus stored in five decade switches on the keyboard. As soon as the estimator has accumulated the total number of items of this kind found on the drawings, he simply presses the "record" button on the keyboard, activating a data scanner, which transfers the identification code stores in the keyboard as well as the "quantity" stored in the display register to the paper tape punch, which records in the language used by the associated computer. At the same time the counter-register is cleared and readied for the next item.

Results from use of the system of this invention indicate that the usual benefits of machine handling of data are abundantly evident, i.e., increased speed and accuracy The amount of time required to take data off of architects' drawings has been reduced by from five to ten times. Used in conjunction with the Estimatic system, overall estimating time has been reduced from four to five times over purely manual methods. In addition to these tangible improvements in estimating, it should be noted that the complete system gives the user a very significant improvement in material scheduling, labor management, billing, cost accounting, and general management control.

Returning to a detailed description of the system or machine, the input to the counter 21 is the pulse originating from the pencil 10 or tracker 11, which is picked up by the loop antenna 17 and detected by CR1 (FIG. 5). Under a no-load condition, the detected pulse will have a peak amplitude of 6 volts or more. However, the input tube V1A (FIG. 5) will clip this back to .75 volt.

The pulse is positive on the grid of V1A and produces a peak amplitude of 10 volts negative on the plate of this tube. This amplified pulse is used to fire the thyratron V2. Because of switch contact bounce in the pencil 10 or tracker 11, it is conceivable that both the leading and trailing edges of the pulse can fire the thyratron; indeed, this sometimes happens if the control R15 in the cathode of V2 is maladjusted.

As previously mentioned, the shape of the pulse is important because the loop antenna is capable of not only picking up the pencil 10 and tracker 11 pulses, but noise pulses also. Since the pencil pulse is square and a noise pulse generally presents a sharp leading edge and a relatively slow trailing edge, a possibility exists for differentiating between the desired pencil pulses and the undesired noise pulses. This is accomplished by using the trailing edge of the pencil pulse through the differentiating action of C2 and the suppression of the negative swing of the differentiated pulse by the diode CR22. Only a 4-volt, 500 μsec. positive pulse appears at the thyratron grid as the pencil switch opens. Thus, with R15 properly adjusted, the thyratron will fire only when the pencil pressure is removed.

A means for tuning the loop antenna 17 is provided on a box which holds the loop tuning condenser under the table. By throwing a toggle switch, the detector diode is reversed; and it then produces a negative voltage on the counter input, which is applied to V1A. When the pencil 10 is pressed on the table top, the negative voltage cuts off V1A, causing the plate votlage to rise to the +160-volt B supply. This is sufficient to cause a neon pilot tube to glow.

Operation in the pencil position is as follows: When a positive pulse is applied to the thyratron (V2) grid, the tube momentarily conducts heavily, producing a sharp negative pulse of approximately 120 volts on its plate. The condensers in the plate circuit are discharged to ground and then charge again when the tube has ceased conduction. The time constant of the RC combination in the plate circuit is determined primarily by C30. Switch SW1 adds C31 in parallel with C30 to provide a longer time constant for pencil operation only. Thus, maximum protection against double firing of the thyratron is obtained.

With switch S1 in position 1, the "pencil" position, the pulse is applied through the gate consisting of C7, R23, and CR5 to the "units" counter, CMC3. The various gates are required because pulses are injected to the counters from more than one source. For instance, the "units" counter can receive pulses from either the pencil, the "tenths" counter or the riser dial 26, which is described hereinbelow. The gates are also necessary to prevent reverse triggering of the counter preceding the one being used, especially when riser dial information is entered.

Operation in the tracker position is as follows: The five remaining positions of the switch S1 provide for any of the tracker scales: 1/16", 1/8", 1/4", 1/2", 1". On position 2 of SW1, the pulses originating from the tracker 11 are fed through the gate consisting of CR4, R24, and C8 to the "tenths" counter. On the last four positions of the switch the pulses are fed to the "binary" counter input; and the binary output is switched in another deck on SW1, through V5 to the 10ths counter input. V5 is used for amplification and sharpening of the 2–4–8–16 binary output pulses, which, without amplification, are unable to trigger the counter.

The operation of the binary count is as follows: First it should be remembered that the tracker 11 emits a pulse for every 1/16" travel. When the pulse is switched to the binary input, 2–4–8– and 16 pulses are required to produce one pulse from the 8–9–10–11 output pins of the binary, respectively. Since the binary outputs are switched progressively, the scale is effectively multiplied and becomes 1/8", 1/4", 1/2", and 1".

When counting with the pencil 10 it is desirable to insure that the count actually enters the counter. The operator cannot visually observe the count and at the same time give full attention to the details of the drawings on which he is operating. Therefore, an audible click signal is provided which informs the operator of each count entering the counter. If a count is missed for any reason, no click is heard.

To accomplish this surely, the signal must be obtained from the "units" counter. As the first flip-flop of the "units" counter is pulsed, alternate negative and positive pulses occur at terminal 8 of this counter. The positive pulse is applied to grid 2 of V3, and this causes an increase of current through the relay coil in the common plates of this tube, causing the relay to click. The negative pulse is inverted by tube V1B and becomes a positive pulse on grid pin 7 of V3, which now has the same effect as the pulse on the positive pulse on grid pin 2 of this tube. The resulting pulses in the common plate circuits of V3 cause the relay K1 to produce an audible click each time the "units" counter changes state. This click circuit is disabled by SW1 for all tracker positions.

Since elevations are not measurable on a two-dimensional drawing, a telephone dial 26 is provided to permit the operator to add unit counts that would be equivalent to the elevation from the floor to an outlet box or wall switch plate. Pulses from this riser dial 26 may also be switched into any one of the five-digit positions of the counter register for convenience in presetting or rearranging data in the register. A riser dial 26 is provided which enables the operator to dial into the counter quantities which are not counted by the pencil 10 or measured by the tracker 11. The dial is located on a keyboard for convenience, with five keys which allow the operator to select the column into which he wishes to dial a number. For instance, if the operator wishes to directly add 50 units of the type he is checking, he would punch the "10" key and dial "5"; this would add 50 to the count.

The method by which this accomplished involves the use of the thyratron tube V4 (FIG. 5). The cathode of this tube is normally open. After the riser dial 26 is turned to any given number, it is released, and then its switching intermittently closes the cathode circuit the number of times chosen. The thyratron conducts during the intermittent closures, producing a negative pulse on its plate. The plate is switched by SW5, located on the keyboard, through the interconnecting cable to plug J9. This switch connects the plate of thyratron V4 to either the 1/10's, 10's, 100's, or 1,000's columns through gating circuits. For instance, if the units button on the keyboard is depressed, the riser dial is connected through the gate consisting of C21, R69 and CR13. The pulses originating at V4 plate are negative square waves; they are differentiated by C21 and R69. The negative edge causes CR13 to conduct, and it triggers the "units" counter. This negative pulse is blocked by CR8; and thus it does not disturb the count on the 1/10th counter. The gates are similar on all counter inputs.

The count is stored as follows: The output terminals of each counter are 8–9–10 and 11. All flip-flop outputs are isolated by 1 megohm resistors. The output of the counters is arranged to produce the 1–2–2*–4 binary code. This code for counts 0–9 is as shown in the diagram below:

|    | 0 | 1 | 2 | 3 | 4 | 5 | 6 | 7 | 8 | 9 |
|----|---|---|---|---|---|---|---|---|---|---|
| 1  |   | X |   | X |   | X |   | X |   | X |
| 2  |   |   | X | X |   |   | X | X |   |   |
| 2* |   |   |   |   | X | X | X | X |   |   |
| 4  |   |   |   |   |   |   |   |   | X | X |

For convenience, the outputs of the counter flip-flops are designated either as 0 or 1, and 1 corresponds to X in the above diagram.

The flip-flop outputs are shown in the diagram below. Note the agreement with the code chart shown in the diagram above.

|   | Flip-Flop | | | |
|---|---|---|---|---|
|   | 1 | 2 | 3 | 4 |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 1 | 1 | 0 |
| 5 | 1 | 1 | 1 | 0 |
| 6 | 0 | 0 | 1 | 1 |
| 7 | 1 | 0 | 1 | 1 |
| 8 | 0 | 1 | 1 | 1 |
| 9 | 1 | 1 | 1 | 1 |

At each counter output terminal, when a count is entered into a counter, a zero or negative voltage exists across any of the resistors R39 through R48 (FIG. 5), depending on the state of the flip-flops. The voltage division between the +160 and −150 volts produces approximately −15 volts when the output section of the flip-flop conducts, and 0 volts when it is in the cut-off condition. Zero volts is considered to be "ON" or "1," and −15 volts is "OFF" or "0."

It is now clear that each counter stores the numerical information in terms of any number from 0 to 9 by electrical levels which exist on the flip-flop outputs.

The count is read, with reference to FIG. 5 as follows: Since this electrical information exists and can be maintained across the resistors R39 through R48, a scanning process is used to:

(1) Read off the levels.
(2) Convert the 1–2–2*–4 code to standard teletype code.
(3) Punch the resulting information onto punched paper tape.
(4) Reset the counters to zero.

A mechanical stepping switch, K15, shown on FIG. 5 by six vertical columns of figures, 1 to 11, is used for scanning the counter outputs. The scanning rate is 6 c.p.s. It should be that the middle four columns reading from right to left are designated in order 1's, 2's, 2*'s, 4's.

Eleven contacts exist on each column or switch deck. C references the common switch arm, and 1 at the top is shorted to C while in the "home" position when the scanning process has stopped. The blocks numbered 2 to 11 inclusive are switch contacts which are scanned by the switch arm when the scanning process is active. All decks are stacked mechanically so that they are scanned simultaneously. The last switch stack on the left is used to ground the relay coil in the line counter, which causes this counter to advance one unit each time a scanning operation is made. The column marked "RESET" operates relay K2, which opens the reset terminal 2 of the counters each time the scanning operation is completed. The manual button SW2, located on the counter panel, operates relay K2 also when it is depressed, thus allowing the operator to clear all counts to zero when desired.

The scanning process is initiated by pushing the "Record" button on the keyboard, which energizes relay K7. The bottom contacts of this relay close the reset terminal 2, counter CMC7. This counter is driven by a 60-volt Schmitt trigger, V6, and the counter emits a pulse every ⅙ of a second from its terminal 11, since it divides by 10. This pulse drives relay K14 by V7, and relay contacts now close and open six times per second. The top relay contacts actuate the stepper relay while the bottom contacts operate the punch, as will be described later. The switch on the stepper relay K15 should be noted. It is shown on the switch homing position, where it is mechanically opened by a cam which rotates with the stepper. In any position, it causes terminal 2 of CMC7 to be shorted to ground and keeps the stepping operation active, but it effectively stops the scanning operation at the end of each complete scan.

It will be noted by reference to FIG. 5 that terminals 2, 3, 4, 5, and 6 on the stepper switch are connected to plug J10, which terminates by a cable at the keyboard. Here the zero or negative levels are set up by depressing any one button in each of five rows of push-button switches. The levels indicate the identification code. The terminals 7, 8, 9, 10, and 11 on the stepper switch are connected to the counters, and therefore the levels express quantity. Position 1 is wired to the rotary selector switch on the keyboard. This switch generates a different code number for each type of operation, such as "Normal Take-Off," "Deviation," "Subtract," etc.

The stepper switch is spring-driven, and, therefore, it lags the driving pulse by one step. For this reason, the first data which is punched is position 1, where the stepper is homed. After position 1 has been punched, the stepper drive pulse is removed; and the stepper advances one step to position 2.

The actual punching sequence is as follows:

(1) When the "Record" button is depressed, relay K7 closes, locking itself in and grounding the reset bus of counter CMC7.
(2) CMC7 begins to count the 60-c.p.s. input down by 10, producing an output pulse of 6 c.p.s.
(3) Each output pulse of CMC7 operates V7, which drives K14.
(4) As K14 is activated, it pulls in the coil armature of stepper K15 (but K15 does not yet move). At the very same time, a negative pulse is directed through CR6 to delay multivibrator V10, causing it to operate.
(5) When V10 operates, it causes relay K13 to close for a measured length of time (30 ms.), energizing the punch.
(6) The punch punches one digit, which is set up on relays K8 through K12.
(7) As the stepper drive pulse is removed, the stepper advances one step, setting up the next digit to be punched; and the operation is repeated until the entire word has been punched.

As the stepping switch advances it progressively connects the outputs of the keyboard and then the counters to the four control grids of tubes V8 and V9, starting with position 1. The levels applied to these grids determine the setting of the relay contacts of K3, K4, K5, and K6, where either the top or bottom contact is grounded, depending on the grid voltage.

A description of the conversion matrix follows: The purpose of the conversion matrix is to change the binary 1–2–2*–4 code into the standard teletype code, so that the coded tape output of the system may be transmitted over teletype facilities. First examine the two codes given in the diagram shown below:

1-2-2*-4 CODE

| | | | | | | | | | | | | | | | |
|---|---|---|---|---|---|---|---|---|---|---|---|---|---|---|---|
| 1 |   | X |   | X |   | X |   | X |   | X |   |       |   | X |   |       |
| 2 |   |   | X | X | X | X |   |   | X | X |   | SPARE |   |   | X | SPARE |
| 2* |   |   |   |   | X | X | X | X | X | X | X |       |   |   | X |       |
| 4 |   |   |   |   |   |   | X | X | X | X |   |       | X |   | X |       |
| No | 0 | 1 | 2 | 3 | 4 | 5 | 6 | 7 | 8 | 9 | CR |      | — | 1 | ′ |       |

See notation below.

TELETYPE CODE

| | | | | | | | | | | | | | | | | |
|---|---|---|---|---|---|---|---|---|---|---|---|---|---|---|---|---|
| 1 | | X | X | X | | | X | X | | | | SPARE | X | X | X | | SPARE |
| 2 | X | X | X | | X | | X | X | | | | | X | | | | |
| 3 | X | X | | | | X | X | X | | | | | | X | | | |
| 4 | | | | X | | | | | X | X | | | | X | | | |
| 5 | X | X | X | | X | X | | | X | | | | | X | X | | |

Open Spaces = Zero.   X = 1 Level.   CR = Deviation.   1 = I.D.   " = Data.   — = Subtract.

The code conversion matrix is really two matrices in one. First the 1–2–2*–4 code is converted by means of AND gates to straight decimal code plus some special identification characters; second, the decimal code is converted by means of OR gates to teletype code to drive the punch. The left side of the schematic diagram of the diode matrix (FIG. 6) consists of the first decoder. Compare the symmetry to the 1–2–2*–4 code.

The matrix is driven by relays K3, K4, K5, and K6 such that a number is open when ON and grounded when OFF. Thus when the code for zero is entered into the matrix, inputs not 1, not 2, not 2* and not 4 are all open. This allows the 0 bus to be pulled negative by R16. The 0 bus pulls TT2, TT3, and TT5 negative by CR72, CR78, and CR92, and these three teletype lines energize their respective relays, causing these columns to be punched.

If the code for 1 is entered, inputs 1, not 2, not 2*, and not 4 are open, allowing the 1 bus to be pulled negative. This energizes TT1, TT2, TT3, and TT5. The other numbers all operate in the same manner. In the event of a malfunction in the matrix, it is possible to inject a known code and follow the logic through the board until the defect is isolated.

The keyboard control is described with reference to FIG. 7. The keyboard control functions to allow the estimator to set up identification codes by pushing the appropriate keys and to insert desired quantities into the counter by the use of the riser dial and its selected switch SW6. A function switch, SW3, is also incorporated which provides for the normal take-off, deviation, hold, subtract, and I.D. coding functions.

The first three rows of keys insert the first three significant numbers of a desired code; and when the three keys are pushed, the microfilm display is actuated, resulting in the microfilm display of all the codes for a given set of assemblies. These codes, taken from the Estimatic system, are followed by two figures which now fully identify any given assembly. To complete the identification the last two code numbers are recorded by pushing the appropriate keys in the last two rows on the keyboard. After this identification operation, the count can be registered; and upon completion of the count, the record switch SW2 is depressed, causing the scanning operation to occur in the counter, previously described. This causes the assembly code and the quantity to be transferred to the punched paper tape.

When the first three numbers are keyed into the keyboard, SW8, SW9 and SW10 are actuated. SW9 and SW10 are identical. However, the digits 7, 8, and 9 are not wired on SW10. This is so because the Estimatic code has no numbers in excess of 70,000; and it is believed it is better to disable the keys 7, 8 and 9 until more codes become available, at which time these keys can be wired in.

Reference now is made to FIG. 8. Suppose the key button on SW10 is pushed from a pre-set position 3 to a new position 5. First, examine the circuit; a 12-volt RMS voltage from a transformer is connected across nine resistors in series, so that the voltage divides up more or less evenly across the resistors. The AC phase difference on one end of the string is 180° with respect to the other end. Consequently, there must exist a phase difference as well as a voltage across each resistor in the string. The resistors are wired to the two switches, SW10 and a 10-position switch actuated by a Veeder-Root counter located on the microfilm servo chart drive. When the arms of the two switches are on the same position, no voltage or phase difference exists across them, so that there is no input to the servo amplifier.

When a key is depressed, it releases the previously set key and a voltage appears at the input to the servo. Its phase depends on the relative position of the two switch arms. Since the servo system is phase responsive, the servo motor turns in the direction which will bring the switches together again, at which time the system will null and the servo motor will cease running.

Because three significant numbers are needed, a method of sequential transfer from the most significant number to the next, and from it to the third, is necessary. FIG. 9 shows how this is accomplished. The keys for number "558" are shown depressed. It will be noted that the last significant figure is obtained by comparing the resistance setting with a potentiometer setting. The first two significant figures are obtained as indicated previously, by a short circuit of the switch arms. Thus, while the resistance for the 10,000 and 1,000 arms are uncritical, the 100's are selected to be within 0.5% of each other. When a 10,000 key is depressed, the servo motor instantly operates; and it then turns in the proper direction until the switches come together and produce a null. While any AC voltage exists across the two switch arms, a negative voltage is developed by the rectifying action of the diode circuits in the grid circuit of V6A. This DC voltage cuts the tube V6A off, and the relay K1 is then in its quiescent condition with the contacts connecting the output of the 10,000's bridge to the servo amplifier input. As soon as the two switch arms coincide, the grid voltage on V6A grid rises, causing the tube current to increase, which energizes the relay, thus transferring the servo amplifier input to the 1,000's output. This operation is repeated on the 1,000's; and as soon as the null condition is obtained, V6B energizes relay K2 and the servo amplifier input is transferred to the network consisting of the 100's resistors and the 20,000-ohm potentiometer.

The servo motor continues to run until zero voltage is obtained from this bridge. Thus, the depression of any 10,000's, 1,000's, or 100's key will cause the servo system to operate. At the same time, the depressed keys set up a series of voltage levels which provide the 1–2–2*–4 identification code. Reference is made to FIG. 7, schematic for the keyboard. First, consider the code levels. Ground or zero level indicates a 1, while a minus level indicates a zero. Now observe the 10,000's switch. R4, R6, R7, and R8 have one side wired to −20 volts. Thus, on the switch side, when the switch is open, a −20-volt open circuit voltage exists. When a key is depressed, one or more of these four resistors may be grounded. The sequence of voltage levels versus the keys is as follows:

| Key | 0 | 1 | 2 | 3 | 4 | 5 | 6 | 7 | 8 | 9 |
|---|---|---|---|---|---|---|---|---|---|---|
| R7 | 0 | X | 0 | X | 0 | X | 0 | X | 0 | X |
| R6 | 0 | 0 | X | X | X | X | 0 | 0 | X | X |
| R5 | 0 | 0 | 0 | 0 | X | X | X | X | X | X |
| R8 | 0 | 0 | 0 | 0 | 0 | 0 | X | X | X | X |

Reference to the 1–2–2*–4 code diagram given above, clearly indicates how the identification code levels are obtained. The five rows of switches are wired to produce these same levels.

Since each resistor is connected to the scanning switch on the counter chassis in proper sequential order, it is apparent that the scanning operation will record the codes (converted to the teletype codes by the matrix) on the punched paper tape. The function switch SW3 is code-wired in a similar way. It is connected to position No. 1 on the scanning switch on the counter chassis. The information on this switch is the first punched onto the tape, giving the instructions to the computer first as the tape is procesed.

The Forward-Reverse switch SW1 operates to shift the microfilm one picture in either direction. There are 1307 discrete pictures containing lists of assemblies in the microfilm. In most cases a given code number may need two complete pictures for all of the assemblies which are listed. The servo system registers either one or the other; and if the desired assembly is not found on the first list, the Forward-Reverse switch is pushed and the film will be moved over to the next picture for viewing the second list.

SW1 accomplishes this by inserting a resistance in either the top or the bottom of the resistance string on SW8, the pushbutton switch which operates against the servo potentiometer. To obtain balance, the servo resets the pot by the exact amount of one picture displacement each time the switch is pushed. This, of course, corresponds to the amount of resistance represented by R55 or R56.

The "Record" switch is used to trip relay 7 on the counter chassis, which initiates the scanning process. A warning light in the Record switch indicates to the operator that he has failed to complete the catalog number. Associated with the Record switch are relay K1 and switch SW4 in the keyboard. When either of the last two significant figures is entered, switch SW4 is closed momentarily. This energizes relay K1, which locks in the energized position and extinguishes the warning light in the Record switch SW2. Another warning light in the Record switch is energized through SW3 and warns the operator whenever the selector is in other than "Normal Take-Off" position.

The servo amplifier is located under the table. Under the discussion of the keyboard, it was shown that by depressing any one of the 10,000, 1,000, or 100 keys, a 60-cycle AC voltage is set up, the phase of which depends on the relationship of the key switch and the switch of the Veeder-Root counter. In addition, the method of electrical transfer from the first significant figure to the next, and then to the third figure, was shown. Reference now is made to FIG. 10, the schematic for the servo amplifier. The notation "Indicates same polarity at these points on transformers" is significant. It means that the phase of the voltages is critical throughout the system and that a reversal of any one of the transformer windings or its input can make the system completely unusable.

The three inputs from the keyboard are connected through J1 and are progressively switchel to the input of the amplifier V1A by the relay system of K1 and K2. TP3 and TP4 are test points for checking the operation of the relays. If the test points are shorted to ground with V6 removed from its socket, the relays will throw, which allows a check on the keyboard operation. It is advisable at this point to study FIG. 9 which provides a simplified schematic of the keyboard and relay function. FIG. 10 shows the amplifier connected to inputs 11 and 22 on connection J1. This is the input from the 10,000 keys. As soon as a 10,000 key is pressed a 60-cycle voltage is applied to the grids of V1A and V1B. This voltage is transformer-coupled to V2A, which in turn feeds the amplifier tube V3B. V3A is a phase inverter necessary to drive the push-pull output tubes V4 and V5. The outputs of V4 and V5 are transformer-coupled to the servo motor through terminals 20 and 21 of connector J1. The boxes marked 3 and 1 at J1 indicate the proper terminals on the servo motor.

A feedback "damping" voltage from the servo motor, terminals 17 and 18 on J1, is applied to the grid of V2B, the plate of which is parallel-connected with tube V2A. R20 serves to control the amplitude of this feedback voltage. The two other controls provided are the phase control, R4, and the gain control, R5. The servo motor will run when any voltage exists on the input to the servo amplifier, and it will rotate in a direction corresponding to the phase of the applied voltage. It operates or turns the two decade switches of the Veeder-Root counter, which are wired in parallel with the 10,000 and 1,000 keyboard switches (see FIG. 9).

As described in the discussion of the keyboard, when the Veeder-Root switching corresponds with the pushbutton switching, a null is developed; and the voltage input to the servo is zero. It was also shown in the keyboard section how the relay switching from the 10,000's to the 1,000's to the 10's column is accomplished (see FIG. 9). Actually, K1 is operated by tube V6A. When the pushbutton switch and the Veeder-Root switch are not in agreement, the AC vlotage which then exists is rectified by CR1 and CR2. This is a voltage doubler circuit; and it produces a negative DC bias which cuts off the tube. At zero voltage—which occurs when the switches are coincident, the tube current rises sufficiently to cause the relay to close; and the input to the servo amplifier is then connected to terminals 16 and 2 of the connector J1. This is the output of the 1,000's column. The servo continues to run until the second section of the Veeder-Root switching is coincident with the 1,000's setting on the keyboard; when this condition obtains, the relay K2 is operated by tube V6B, and then the input to the servo amplifier is connected to terminals 4 and 6 of connector J1, the output of the 100's column, which consists of the third line of the series-fixed resistance, on the keyboard, and the 20,000-ohm precision potentiometer, which is located on the microfilm chart drive chassis, FIG. 11. The transformer T4 supplies the 12-volt AC potential to the keyboard through terminals 25 and 14 of connector J1. The power supply section of the servo amplifier is conventional and needs no discussion.

The power supply is shown in FIG. 12. This unit is located under the table. It consists of a +160-volt regulated supply, utilizing tubes V1, V2, V3, V4, V5, and a −150-volt low-current regulated supply using diodes CR6, CR7, CR8 for rectification and V7, the OD 3 regulator, and a −28-volt unregulated supply using bridge rectifiers CR1, 2, 3, 4 and a −20-volt supply regulated by zener diode CR5. The +160 volt supply is used for the counter plate and filament power. The −150-volt supply is used for the development of the ID coding.

The −28-volt supply provides for the operation of the relays, and the −20-volt supply operates the transistor and diode circuits and indicator lights.

Although a detailed description of a specific embodiment of the data acquisition system or machine of this invention was given hereinabove, it will be understood that many modifications and variations of the system of the present invention are possible in the light of the teachings given hereinabove. It is, therefore, to be understood that, within the scope of the appended claims, the invention can be practiced otherwise than as specifically described.

What is claimed is:

1. A data acquisition system comprising: an electronic pulse transmitting means movable over a data sheet for transmitting pulses in accordance with the data on said data sheet; a radio pulse receiver means tuned to receive radio pulses transmitted by the electronic checking means; a pulse shaping circuit connected to the receiver means for discriminating between noise and the radio pulses transmitted by the checking means; a binary divider means connected to the pulse shaping circuit for generating a count to correspond to a scale unit in accordance with data checked by the electronic checking means; a counter register means connected to the divider means for accumulating unit counts corresponding to the radio pulses; unit count adder means connected to the counter register means for adding counts in accordance with additional dimensions beyond those being checked; optical index means for digital encoding of data connected to the adder means; and a recording means connected to the register means for recording the counts.

2. A data acquisition system comprising an electronic pulse transmitting means movable over a data sheet for transmitting pulses in accordance with the data on said data sheet; a radio pulse receiver means tuned to receive radio pulses transmitted by the electronic checking means; a pulse shaping circuit connected to the receiver means for discriminating between noise and the radio pulses transmitted by the checking means; a binary divider means connected to the pulse shaping circuit for generating a count to correspond to a scale unit in accordance with data checked by the electronic checking means; a counter register means connected to the divider means for accumulating unit counts corresponding to the radio pulses; unit count adder means connected to the counter register means for adding counts in accordance with additional dimensions beyond those being checked; optical index means for digital encoding of data connected to the adder means; and a recording means connected to the register means for recording the counts, and digital computer means operatively associated with the recording means for computer processing of the recorded counts.

3. A data acquisition system comprising: an electronic pulse transmitting means movable over a data sheet for transmitting pulses in accordance with the data on said data sheet; a radio pulse receiver means tuned to receive radio pulses transmitted by the electronic checking means; a pulse shaping circuit connected to the receiver means for discriminating between noise and the radio pulses transmitted by the checking means; a binary divider means connected to the pulse shaping circuit for generating a count to correspond to a scale unit in accordance with data checked by the electronic checking means; a counter register means connected to the divider means for accumulating unit counts corresponding to the radio pulses; unit count adder means connected to the counter register means for adding counts in accordance with additional dimensions beyond those being checked; optical index means for digital encoding of data and identification of items stored in the counter register means connected to the adder means; and a recording means connected to the counter register means for recording the identity and quantity of items counted.

4. A system as defined in claim 3 including switch means operable for correcting errors.

5. A system as defined in claim 3 including means for automatically preventing improper identification.

6. Apparatus for accumulating data from a data sheet comprising:
electronic converting and transmitting means mounted in a marking means movable over said data sheet and having an electronic circuit for converting the data on said data sheet into pulses representing said data and for transmitting said pulses, a pulse occurring each time a switch located in the marking means is closed;
electronic receiving means for receiving the pulses transmitted by said electronic converting and transmitting means;
pulse shaper means connected to said electronic receiver means for shaping and discriminating the pulses received by said electronic receiving means;
register means connected to said pulse shaper means for accumulating the pulses received by said electronic means; and
adder means connected to said register means for adding data pulses to said register means.

7. Apparatus as claimed in claim 6 including a scanning means connected to the output of said register means for scanning the output of said register means and including a code conversion means connected to the output of said scanning means for converting the output from said register means into a coded output signal.

8. Apparatus as claimed in claim 7 including a tape punch means connected to the output of said conversion means for punching a tape in accordance with the coded output of said conversion means.

9. Apparatus as claimed in claim 8 including optical indexing means connected to said adder means for generating a visible optical index in accordance with the setting of said adder means.

10. Apparatus as claimed in claim 9 wherein said optical index means is a microfilm reader and wherein said adder means includes a dial for dialing pulses to be added to said register means.

11. Apparatus as claimed in claim 10 wherein said adder means includes a control for said microfilm reader whereby said adder means can set up a control signal for said microfilm reader.

12. Apparatus for accumulating data from a data sheet comprising:
electronic converting and transmitting means mounted in a marking means movable over said data sheet and having an electronic circuit for converting the data on said data sheet into pulses representing said data and for transmitting said pulses, a pulse occurring each time a switch operated by a wheel located in the marking means revolves a predetermined distance;
electronic receiving means for receiving the pulses transmitted by said electronic converting and transmitting means;
pulse shaper means connected to said electronic receiver means for shaping and discriminating the pulses received by said electronic receiving means;
register means connected to said pulse shaper means for accumulating the pulses received by said electronic receiving means; and
adder means connected to said register means for adding data pulses to said register means.

13. Apparatus as claimed in claim 12 including a scaling means connected between said pulse shaper and said register means for scaling the pulses from said pulse shaper in a predetermined manner.

14. Apparatus as claimed in claim 13 including a scanning means connected to the output of said register means for scanning the output of said register means and including a code conversion means connected to the output of said scanning means for converting the output from said register means in a coded output signal.

15. Apparatus as claimed in claim 14 including a tape punch means connected to the output of said conversion means for punching a tape in accordance with the coded output of said conversion means.

16. Apparatus as claimed in claim 15 including optical indexing means connected to said adder means for generating a visible optical index in accordance with the setting of said adder means.

17. Apparatus as claimed in claim 16 wherein said optical index means is a microfilm reader and wherein said adder means includes a dial for dialing pulses to be added to said register means.

18. Apparatus as claimed in claim 17 wherein said adder means includes a control for said microfilm reader whereby said adder means can set up a control signal for said microfilm reader.

References Cited
UNITED STATES PATENTS

| | | | |
|---|---|---|---|
| Re. 25,600 | 6/1964 | Goldwater | 178—4 |
| 2,588,102 | 3/1952 | Forero | 340—177 |
| 2,627,224 | 2/1953 | Wolf | 235—92 |
| 3,102,926 | 9/1963 | Fluhr | 178—18 |
| 3,127,588 | 3/1964 | Harmon | 178—19 X |
| 3,175,191 | 3/1965 | Cohn | 340—168 X |
| 3,181,162 | 4/1965 | Cameron | 340—168 X |
| 3,212,059 | 10/1965 | Eldridge | 340—152 X |
| 3,229,075 | 1/1966 | Palti | 340—146.3 X |

MAYNARD R. WILBUR, *Primary Examiner.*

G. MAIER, *Assistant Examiner.*